March 8, 1966   C. F. BUHRER   3,239,671
SINGLE-SIDEBAND LIGHT MODULATOR
Filed May 21, 1962   3 Sheets-Sheet 2

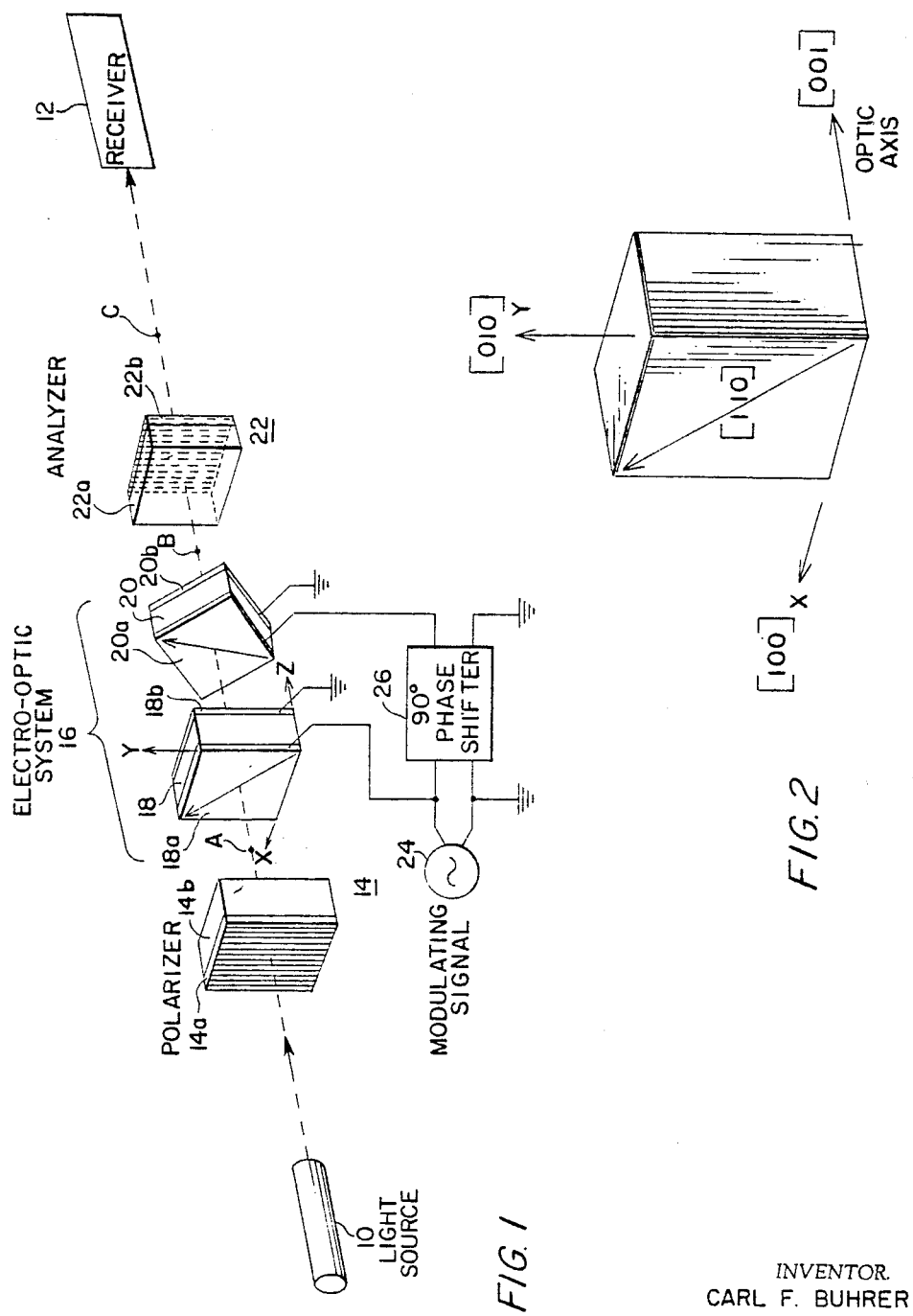

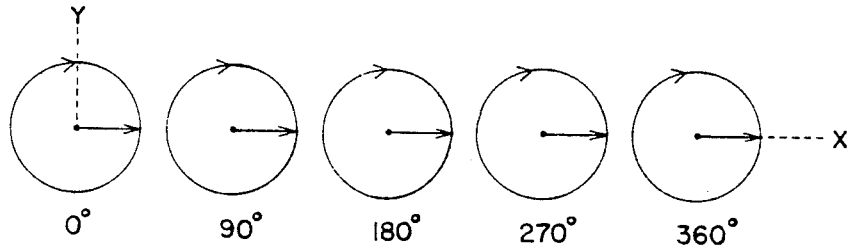

a) INPUT LEFT-CIRCULARLY POLARIZED LIGHT AT POINT A
(Z AXIS OUT OF PAPER)

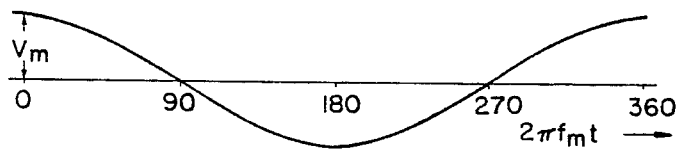

b) MODULATION VOLTAGE ACROSS ELECTRO-OPTIC CRYSTAL 18

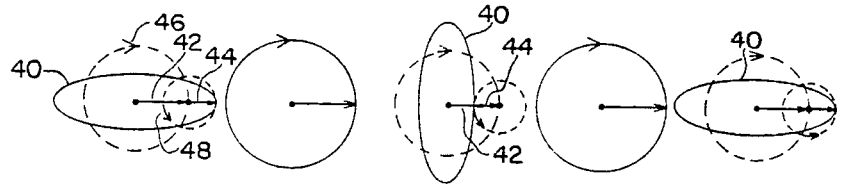

c) CIRCULAR POLARIZATION COMPONENTS OF LIGHT EMERGING FROM ELECTRO-OPTIC CRYSTAL 18

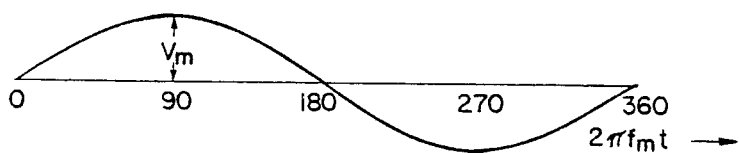

d) MODULATION VOLTAGE ACROSS ELECTRO-OPTIC CRYSTAL 20

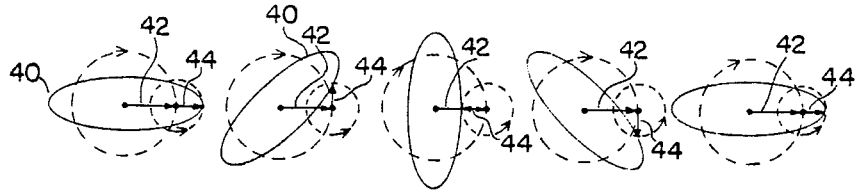

e) CIRCULAR POLARIZATION COMPONENTS OF LIGHT EMERGING FROM ELECTRO-OPTIC CRYSTAL 20

FIG. 3

INVENTOR.
CARL F. BUHRER
BY
R. J. Frank
ATTORNEY

March 8, 1966    C. F. BUHRER    3,239,671
SINGLE-SIDEBAND LIGHT MODULATOR

Filed May 21, 1962    3 Sheets-Sheet 3

INVENTOR.
CARL F. BUHRER
BY
R. J. Frank
ATTORNEY

United States Patent Office 3,239,671
Patented Mar. 8, 1966

3,239,671
SINGLE-SIDEBAND LIGHT MODULATOR
Carl F. Buhrer, Hempstead, N.Y., assignor to General Telephone and Electronics Laboratories, Inc., a corporation of Delaware
Filed May 21, 1962, Ser. No. 196,357
19 Claims. (Cl. 250—199)

This invention relates to modulators and in particular to methods and apparatus for producing single-sideband modulation of a light beam.

Optical communications systems using coherent light sources display excellent directivity. As a result, a number of communications links may operate within sight of each other at nearly the same optical wavelength without interference. Coherent light sources known as optical masers (or lasers) have been developed, but the problems involved in transmitting information by means of a light beam remain significant.

For example, superheterodyne reception is very desirable for optical systems that must operate with noise in the form of background light because a superheterodyne receiver passes only those frequency components of the input noise that fall within the signal and image bands. However, a major problem in obtaining superheterodyne optical reception is the generation of a local oscillator light signal at a frequency differing from the light carrier frequency by the desired intermediate frequency. In some cases it may be possible to obtain this signal from a receiver laser of the same design as the transmitter laser but operating in a different mode. This solution is not entirely satisfactory however because only a small number of discrete frequencies can be produced in this way and these frequencies cannot be tuned. Tuning is a necessary feature in certain applications, such as in the reception of signals from objects moving fast enough to produce Doppler frequency shift, and it is desirable in many other applications.

One way to produce a tunable local oscillator signal is to modulate a local laser oscillator with a sinusoidal modulating frequency and use one of the resulting sideband frequencies as the local oscillator signal. This frequency can be varied by varying the modulating frequency. However, the other sideband frequency and the local laser frequency will also mix with the incoming signal, and the spectra of these heterodyne products will overlap the desired spectrum unless the local laser oscillator frequency differs from the transmitter laser frequency by at least twice the signal bandwidth. This difficulty can be avoided by using a single-sideband suppressed-carrier optical modulator to produce the desired sideband frequency. Such a device would in effect shift the frequency of the local laser oscillator without introducing additional frequency components.

Accordingly it is an object of my invention to provide a system for producing single-sideband modulation of electromagnetic radiation.

It is another object of my invention to provide a system for producing single-sideband modulation of a light beam.

Yet another object is to provide a system for producing single-sideband suppressed-carrier modulation of a light beam.

Still another object is to provide a system capable of modulating light at frequencies up to and including the microwave range.

A further object is to provide a system for simultaneously modulating light with two separate signals such that these signals appear as upper and lower sidebands respectively.

A still further object is to provide a method of producing single-sideband modulation of a beam of electromagnetic radiation.

As is well known, a carrier having a superimposed amplitude modulated signal may be thought of as consisting of a first signal component varying sinusoidally at the carrier frequency, a second signal component varying sinusoidally at the sum of the carrier and modulation frequencies and a third signal component varying sinusoidally at the difference between the carrier and modulation frequency. Expressed mathematically, the instantaneous voltage $$e = E_0 \sin 2\pi f_c t + \frac{mE_0}{2} \cos 2\pi (f_c - f_m)t - \frac{mE_0}{2} \cos 2\pi (f_c + f_m)t$$

where $E_0$ is the amplitude of the unmodulated wave, $m$ is the degree of modulation expressed as the ratio of the variation in amplitude from the average to the average amplitude, $f_c$ is the carrier frequency in cycles per second, $f_m$ is the modulation frequency in cycles per second and $t$ is time in seconds. In a single-sideband suppressed-carrier modulation system the carrier component $\sin 2\pi f_c t$ and one of the two sideband components are suppressed. That is, all of the information is conveyed by either the sideband component proportional to $\cos 2\pi (f_c - f_m)t$ or the component proportional to $\cos 2\pi (f_c + f_m)t$. As shall be explained, single-sideband modulation of a beam of electromagnetic energy may be achieved by transmitting the beam through a field responsive birefringent medium.

Electric and magnetic fields may be employed to change the dielectric constants of many media. In some of these media, application of an electric or magnetic field causes an anisotropy to be set up such that beams (or waves) of electromagnetic radiation with the same direction of propagation but different directions of polarization travel through the media at different velocities. In particular, there will be one direction of polarization, known as the fast direction, for which the beam velocity is a maximum, while for the polarization perpendicular to this, the "slow" direction, the velocity of the beam will be a minimum. If beams of these two different polarizations start moving through the medium together, the one with the slow direction of polarization will be shifted in time phase or retarded with respect to the other. The amount of this retardation due to induced birefringence in the medium is approximately proportional to the field strength as well as the thickness of the medium.

In the present invention a polarized beam of electromagnetic radiation having a frequency $f_c$ is transmitted through a system consisting of one or more units of a medium having the characteristics described above. Electric or magnetic fields are applied to these units in such manner that the light which emerges from the system is elliptically polarized, the major (and minor) elliptic axis of polarization being rotated about the axis of the beam at a frequency equal to one-half the frequency $f_m$ of the field.

When the incident radiation is circularly polarized, the light emerging from the system consists of a first circularly polarized component rotating in the same sense as the incident beam and a second circularly polarized component rotating in the opposite sense. The first component rotates with the frequency $f_c$ of the incident beam and the second component rotates at a frequency differing from $f_c$ by $f_m$. The second component may be separated from the first component by a circular polarization analyzer that suppresses the carrier frequency component. Thus the beam that emerges from this analyzer has a frequency of $f_c + f_m$ or $f_c - f_m$. Whether this frequency is upper sideband, $f_c + f_m$, or lower sideband, $f_c - f_m$, is determined by the sense of rotation of the major axis of polarization relative to that of the incident circularly polarized beam. The same objective may also be accomplished with plane or elliptically polarized light incident on the system. In these cases, provision must be made to convert to circular polarization within the system.

One embodiment of my invention which is useful at light frequencies employs two units of electro-optic material, a material in which the desired variatiton of light velocity with polarization direction is produced by an electric field. This electro-optic system comprises first and second axially spaced electro-optic crystals oriented so that, in the absence of an electric field, axial light rays with any polarization direction travel with the same velocity. The crystals are also so oriented that, in the presence of an electric field, the fast polarization directions of the two crystals differ by a 45 degree rotation about the light beam axis. For example, if the first and second units are made of potassium dihydrogen phosphate crystals ($KH_2PO_4$), the light beam is directed along the (001) optical axis in both crystals while the (110) axes, which are the fast directions of the crystals, are displaced by 45 degrees.

First and second modulating voltages are applied, one to each crystal, so that in the case of $KH_2PO_4$ the resulting electric fields are directed along the optic axes of the crystals. The first voltage may consist of a single frequency or a set of frequencies. The second voltage contains the same frequency or set of frequencies as the first voltage with the same respective amplitudes but differing in phase by 90 degrees from the first voltage. If the light incident on the system is plane or elliptically polarized rather than circularly polarized, an additional D.-C. voltage is connected in series with the modulation voltage on the first crystal. The magnitude of this voltage and the orientation of the first crystal are chosen so as to produce the desired circular polarization. Similarly, a D.-C. voltage may be applied to the second crystal in series with its modulating voltage in order to convert the desired polarization component to plane polarization. The circular polarization analyzer may then be replaced by a plane polariaztion analyzer.

If the transit time of light through the system is a small fraction of the period of the modulating voltage, the spacing between the first and second electro-optic units is not critical. However, if the modulation frequency is high enough so that this transit time becomes an appreciable portion of a period, then the electrical phase shift between the voltages applied to the first and second crystals must be adjusted to compensate for the transit time.

The above objects of and the brief introduction to the present invention will be more fully understood and further objects and advantages will become apparent from a study of the following description in connection with the drawings, wherein:

FIG. 1 is a schematic diagram of one embodiment of my invention for producing single-sideband suppressed-carrier modulation of light;

FIG. 2 is a diagram illustrating the crystallographic axes of the crystals shown in FIG. 1;

FIG. 3 illustrates the electric vectors and modulation waveforms existing in the modulator of FIG. 1;

Figure 4:
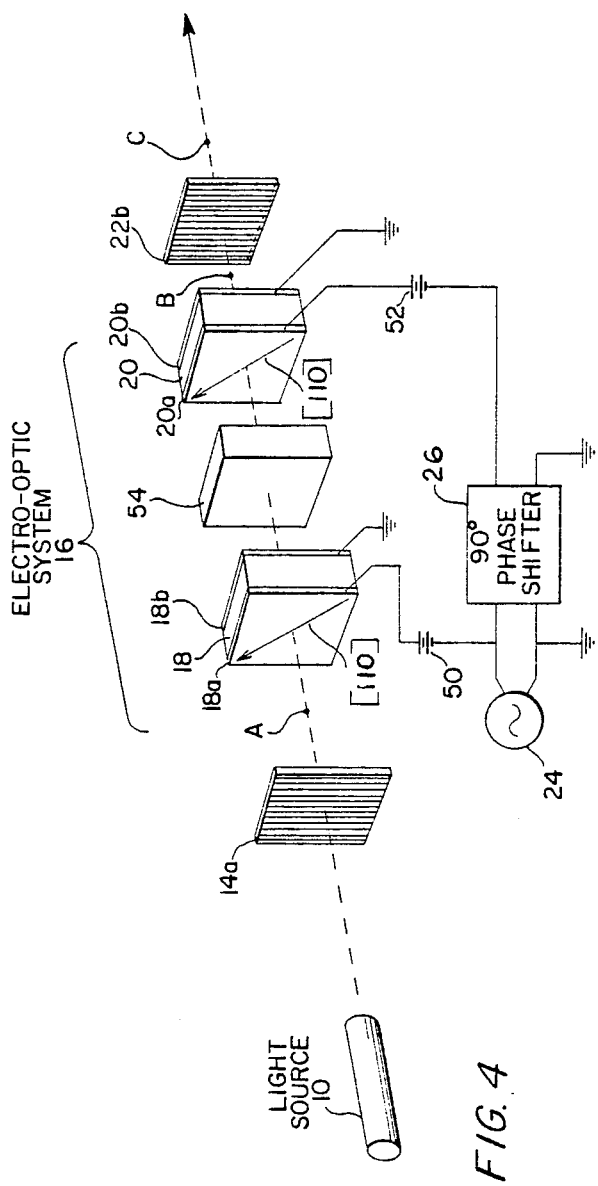
FIG. 4 is a schematic diagram of another embodiment of my invention.

In FIG. 1 there is shown a beam of monochromatic light having a frequency $f_c$ directed by a light source 10 toward a remote receiver 12. The light beam is circularly polarized by a polarizer 14, modulated at a frequency $f_m$ by an electro-optic system 16 consisting of electro-optic crystals 18 and 20, and then propagated through a circular polarization analyzer 22. As will be shown hereinafter, this apparatus produces single-sideband suppressed-carrier modulation of the light beam at the output of analyzer 22.

Source 10 may be any non-coherent light source such as a sodium vapor lamp. Alternatively, a coherent light source such as an optical maser may be used, a gaseous type suitable for this application being described in detail in copending application Serial No. 200,239 filed June 5, 1962 by Kenneth D. Earley et al., now Pat. No. 3,183,937. (It shall be noted that if the light emitted by the optical maser is plane polarized, a quarter-wave birefringent plate may be substituted for the circular polarizer 14.)

The non-coherent light from source 10 is propagated in the z direction through polarizer 14 which consists of a plane polarizer 14a positioned to transmit light with its electric vector oriented in the y direction in the transverse x–y plane and a quarter-wave birefringent plate 14b having its fast polarization direction in the x–y plane in a direction at 45 degrees to the −x and y axes.

Plane polarizer 14a may be made of any material exhibiting dichroism such as tourmaline or Polaroid. The quarter-wave birefringent plate 14b may consist of a thin sheet of split mica or quartz cut parallel to its optic axis and having a thickness which produces a 90 degree relative phase shift between light components in the x–y plane at +45 degrees and −45 degrees from the y axis. With the described orientation of plane polarizer 14a and birefringent plate 14b, the light at point A is circularly polarized in the left-hand direction; i.e. looking toward polarizer 14 from point A the electric vector of the electromagnetic light wave rotates clockwise as the light is propagated in the z direction.

The left-circularly polarized light at point A is transmitted through electro-optic crystals 18 and 20 and emerges at point B elliptically polarized. Crystals 18 and 20 are composed of potassium dihydrogen phosphate and are each provided with transparent electrodes. Electrodes 18a and 18b are secured to opposite faces of crystal 18 and are connected across a source of modulating voltage 24 having a frequency $f_m$. Electrodes 20a and 20b are secured to opposite faces of crystal 20 and are connected to source 24 through a 90 degree phase shifter 26. The modulating frequency $f_m$ is low enough so that the transit time of light between crystals 16 and 18 is a small fraction of a modulation cycle.

FIG. 2 depicts a crystal of potassium dihydrogen phosphate and indicates its crystallographic axes. The optic axis of this crystal is in the (001) direction and, in crystals 18 and 20 of FIG. 1, lies parallel to the z direction. Crystal 18 is oriented so that its (100) axis is in the x direction, its (010) axis in the y direction, and its (110) axis in the x–y plane displaced 45 degrees clockwise (looking from point B) from the y axis. Crystal 20 is positioned so that its (110) axis is in the y direction and (again looking from point B) is displaced 45 degrees counterclockwise from the (110) axis of crystal 18.

FIG. 3 illustrates the operation of the electro-optic system 16 in producing single-sideband modulation of the light carrier during one cycle of the modulating signal. Rotating vectors are used to represent the electric field at 90 degree intervals of the cycle for the left-circularly polarized light at point A (FIG. 3a), the light emerging from crystal 18 (FIG. 3c), and the light at point B emerging from crystal 20 (FIG. 3e). One cycle of the modulating signal across crystal 18 is depicted in FIG. 3b and one cycle of the quadrature signal across crystal 20 is shown in FIG. 3e. For simplicity only, it is assumed that each of the 90 degree intervals of the modulation cycle corresponds to an integral (and very large) number of cycles of the input light frequency. Thus, the electric vector of the circularly polarized light at point A is directed in the $x$ direction at the start of each 90 degree interval of the modulation cycle.

At 0 and 180 degrees of the modulation cycle the input left-circularly polarized light is acted upon by only electro-optic crystal 18, and at 90 and 270 degrees it is acted upon by only electro-optic crystal 20. Application of a positive voltage to one of these crystals induces a birefringence that converts part of the input left-circularly polarized light into right-circularly polarized light so that the resulting output light at point B is elliptically polarized with the major elliptic axis of the rotating vector in the (100) direction of the crystal. Negative voltages produce the same effect as positive voltages, except that the phase of the induced right-polarization component is reversed, causing the major elliptic axis to be in the (010) direction rather than the (100) direction of the crystal. This is indicated in FIGS. 3c and 3e where the solid curves represent the loci of the E vector of the elliptically polarized light and the dashed curves represent the left and right circularly polarized components of the ellipse.

Referring to FIGS. 3a–3c, at 0 degree it is seen that when the amplitude of the modulating voltage from source 24 is $V_m$, the circularly polarized light at point A is converted by crystal 18 into elliptically polarized light having its major axis in the $x$ direction. The locus of the ellipse 40 is generated by the vector sum of constant amplitude vectors 42 and 44. Vector 42 represents the left-circular component of the elliptically polarized light emerging from crystal 18 and rotates clockwise as indicated by the arrow 46. Vector 44 represents the right-circular component and rotates counterclockwise as indicated by arrow 48.

At 90 degrees the voltage across crystal 18 is zero and the crystal is therefore no longer birefringent. Accordingly, the left-circularly polarized light (FIG. 3a) is transmitted through crystal 18 without change. (Between 0 and 90 degrees of the modulation cycle, the minor axis of the ellipse 40 is longer than it is at 0 degree but the major elliptic axis remains oriented in the $x$ direction.)

When the modulation voltage (FIG. 3b) goes negative, the major and minor elliptic axes rotate 90 degrees about the beam axis to the position shown at 180 degrees of the modulation cycle in FIG. 3c. Vector 42, representing the left-circularly polarized component of ellipse 40, is pointing to the right in conformance with the electric vector of FIG. 3a and vector 44 is pointing to the left. At 270 degrees, the input light is unaffected by crystal 18 and at 360 degrees the ellipse has returned to its position at 0 degree.

FIG. 3d represents the modulating voltage at the output of 90 degree phase shifter 26. At 0 degree, crystal 20 is not birefringent since the magnitude of the modulating voltage is zero and therefore the light emerging from crystal 18 (FIG. 3c) is unaffected as shown in FIG. 3e. At 90 degrees, the amplitude of the modulating voltage is equal to $V_m$ causing crystal 20 to become birefringent with the major elliptical axis falling in the (100) direction of crystal 20. Since crystal 20 has been rotated 45 degrees about the beam axis, the major elliptical axis is oriented at 45 degrees clockwise from the $y$ axis when the modulation voltage across crystal 20 reaches a maximum. Therefore, the light emerging from crystal 20 at point B is elliptically polarized with the left-circularly polarized component 42 pointing to the right and the right-circular component 44 pointing upward.

Similarly, at 180 degrees of the modulation cycle the voltage across crystal 20 is zero and crystal 20 does not alter the polarization of the light. At 270 degrees, the modulating voltage is negative and the major elliptical axis rotates 90 space degrees from its position where the modulating voltage was positive, right circular component 44 now pointing downward.

FIG. 3e indicates that the output light at point B consists of two components. One is a left-circularly polarized component of a first fixed amplitude rotating in synchronism with the input left-circularly polarized light (FIG. 3a) and the other is a right-circularly polarized component of a second fixed amplitude. Further examination of FIG. 3e shows that the right-circularly polarized component executes one additional counterclockwise rotation during the modulation cycle as can be seen by examining the successive orientation of the counterclockwise rotating vector 44. Thus, each modulation cycle adds a cycle to the output right-circularly polarized light, and therefore the frequency of this component is the sum of the input light frequency $f_c$ and the modulation frequency $f_m$ i.e., the upper sideband frequency $f_c+f_m$. It can also be seen from FIG. 3e that the direction of elliptic polarization rotates at one-half the modulation frequency in the counterclockwise direction; i.e. opposite to the direction of rotation of the input circularly polarized light.

In order to suppress the left-circularly polarized carrier frequency component, the light at point B is transmitted through right circular analyzer 22 (FIG. 1) consisting of a quarterwave birefringent plate 22a and a plane polarized 22b, analyzer 22 extracting the desired right-circularly polarized sideband component and blocking the left-circularly polarized carrier component.

The lower sideband $f_c-f_m$ can be obtained by reversing the phase of the voltage across either crystal 18 or 20 or by interchanging the left-circular polarizer and right-circular analyzer 22 so that the polarization rotates in the same direction as the input light.

In the embodiment of my invention shown in FIG. 1, the relative orientation of plane polarizer 14a and the fast polarization direction of quarterwave plate 14b is 45 degrees. Similarly, the orientation of electro-optic crystals 18 and 20 is 45 degrees as is the orientation of quarterwave plate 22a and plane polarized 22b. However, the polarizer 14, electro-optic system 16 and analyzer 22 may be rotated with respect to each other without affecting operation of the device. Also, if the relative orientation of plane polarizer 14a and plate 14b is not 45 degrees (but other than 0 degree, 90 degrees or 180 degrees), suppression of the carrier and unwanted sideband can still be achieved by a proper choice of all of the other orientations and the phase difference between the voltages applied to crystals 18 and 20. It shall be noted, however, that it is only when the 45 degree orientation between the crystals and the elements comprising polarizer 14 and analyzer 22 is maintained that the upper and lower sideband may be selected by merely reversing the phase of the voltage applied across crystal 16 or crystal 18. In addition, if an optically active material such as quartz, sodium chlorate, or sugar solution is inserted between crystals 18 and 20, the light transmitted by crystal 18 may be rotated through 45 degrees and the (110) axes of crystals 18 and 20 maintained parallel.

Simultaneous upper and lower sidebands may be generated in the systems of FIGS. 1 and 4 by connecting a first modulating signal having a frequency $f_u$ and amplitude U and a second modulating signal having a frequency $f_1$ and an amplitude L across crystals 18 and 20. Specifically, single-sideband modulation is achieved if the voltage across electrodes 18a and 18b is $$V_1 = U \cos 2\pi f_u t + L \cos 2\pi f_1 t$$

and that across electrodes 20a and 20b is $$V_2 = U \sin 2\pi f_u t - L \sin 2\pi f_1 t$$

The output at C, in this case, consists of a component $f_c+f_u$ above the carrier frequency $f_c$ and a component $f_c-f_1$ below the carried frequency.

FIG. 4 illustrates an embodiment of my invention in which the quarterwave plates 14b and 22a have been replaced by D.-C. voltage sources 50 and 52. In addition, an optically active left-handed quartz crystal 54 is interposed between electro-optic crystals 18 and 20 with its optic axis parallel to the z direction. By "left-handed" is meant that the light emerging from crystal 54 is rotated clockwise from the light entering it. The thickness of crystal 54 is so selected that the light is rotated 45 degrees and therefore the (110) axes of electro-optic crystals 18 and 20 are parallel. As shown in FIG. 4, D.-C. source 50 is connected between modulating source 24 and electrode 18a and D.-C. source 52 is connected between phase shifter 26 and electrode 20a. The D.-C. voltages provide a continuous quarterwave retardation of the propagated light and therefore perform the same function as quarterwave plates 14b and 22a in the device of FIG. 1. However, a 45° orientation between plane polarizer 14a and the (110) axis of crystal 18 and between the (110) axis of crystal 20 and plane polarizer 22b must be maintained to obtain a single sideband output.

If the time required for light to pass between crystals 18 and 20 is not small compared to the period of the modulation cycle, the electrical phase shift between the voltages applied to crystals 18 and 20 can not in general be 90 degrees. For example, if the time required for light to travel between crystals 18 and 20 is one-quarter of a modulation cycle, the voltages applied across the crystals may be either in phase or 180 degrees out of phase to obtain a single sideband output. Such an arrangement is desirable at microwave modulation frequencies because the dimensions are small and because it is adaptable to cavity-type construction.

Figure 5:
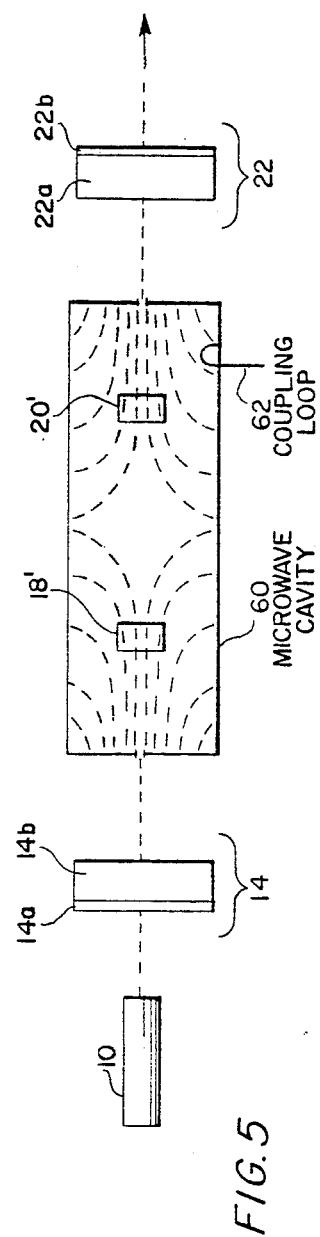
FIG. 5 is a schematic diagram of still another embodiment of my invention particularly useful at high modulation frequencies.

FIG. 5 depicts schematically an electro-optic cavity-type modulator in which electro-optic crystals 18' and 20' composed of potassium dihydrogen phosphate are placed inside a microwave cavity 60 with their optic axis directed along the direction of light propagation, and with their (110) axis rotated 45 degrees from each other. A coupling loop 62 produces an electric field inside the cavity thereby exciting the crystals. If the cavity is cylindrical, it may be operated in the $TM_{011}$ mode or, if it is rectangular, it may be operated in the $TM_{111}$ mode. As shown by the dashed lines, the electric fields are in phase at the crystals 18' and 20', and therefore single sideband modulation is obtained only when the distance between crystals 18' and 20' is such that the light requires an odd multiple of quarter periods of the modulation frequency to travel between crystals.

In the above discussion it has generally been assumed that the modulation signal has a discrete frequency. However, single-sideband modulation is also obtained when the modulation signal consists of a complex waveform provided a 90 degree phase difference is maintained for all frequency components. In the embodiment of FIG. 5, the spacing of crystals 18' and 20' would be selected to best accommodate the range of modulation frequencies.

As many changes could be made in the above construction and many different embodiments could be made without departing from the scope thereof, it is intended that all matter contained in the above description or shown in the accompanying drawings, shall be interpreted as illustrative and not in a limiting sense.

What is claimed is:

1. Apparatus for modulating an incident polarized beam of electromagnetic radiation comprising
    (a) field responsive means for elliptically polarizing said incident beam, the resulting elliptically polarized beam having a major elliptic axis and
    (b) modulating signal means for rotating said major elliptic axis of polarization about the axis of said beam at a frequency equal to one-half the frequency of said modulating signal, the resulting modulated beam having a circularly polarized component rotating at a frequency differing from the frequency of said incident beam by the frequency of said modulating signal.

2. Apparatus for modulating an incident polarized beam of electromagnetic radiation comprising
    (a) means responsive to an electric field for elliptically polarizing said incident beam, the resulting elliptically polarized beam having a major elliptic axis of polarization and
    (b) electric field means for rotating said major elliptic axis of polarization about the axis of said beam at a frequency equal to one-half the frequency of said electric field, the resulting modulated beam having a circularly polarized component rotating at a frequency differing from the frequency of said incident beam by the frequency of said electric field.

3. Apparatus for modulating an incident circularly polarized beam of electromagnetic radiation having a first direction of rotation comprising
    (a) means responsive to an electric field for elliptically polarizing said incident beam, the resulting elliptically polarized beam having a major elliptic axis of polarization and
    (b) electric field means for rotating said major elliptic axis of polarization about the axis of said beam at a frequency equal to one-half the frequency of said electric field, the resulting modulated beam having a first circularly polarized component rotating in said first direction at the frequency of said incident beam and a second circularly polarized component rotating in the opposite direction at a frequency differing from the carrier frequency by the frequency of said electric field.

4. Apparatus for modulating an incident polarized light beam comprising
    (a) electro-optic means for elliptically polarizing said incident beam, the resulting elliptically polarized beam having a major elliptic axis of polarization and
    (b) electric field means for rotating said major elliptic axis of polarization about the axis of said beam at a frequency equal to one-half the frequency of said electric field, the resulting modulated beam having a first circularly polarized component rotating in said first direction at the frequency of said incident beam and a second circularly polarized component rotating in the opposite direction at a frequency differing from the carrier frequency by the frequency of said electric field.

5. Apparatus for producing single-sideband modulation of an incident polarized light beam comprising
    (a) first and second axially spaced electro-optic units, said units being oriented with respect to said light beam so that, in the absence of an electric field, the velocity of light therein is independent of the polarization direction and, in the presence of an electric field, the fast polarization directions of said first and second electro-optic units are displaced about the beam axis with respect to each other and
    (b) means for producing first and second phase differing electric fields having the same frequency components in said first and second electro-optic units respectively, the phase difference between said first and second electric fields being selected to cause the light emerging from said second unit to be elliptically polarized with its major axis of polarization rotating at a frequency determined by the frequency components of said electric field, the resulting modulated beam having a first circularly polarized component rotating in said first direction at the frequency of said incident beam and a second circularly polarized component rotating in the opposite direction at a frequency differing from the carrier frequency by the frequency of said electric field.

6. Apparatus for producing single-sideband modulation of an incident polarized light beam comprising
    (a) first and second axially spaced electro-optic units, said units being oriented with respect to said light beam so that, in the absence of an electric field, the velocity of light therein is independent of the polarization direction and, in the presence of an electric field, the fast polarization directions of said first and second electro-optic units are displaced about the beam axis with respect to each other by 45 degrees, and (b) means for applying first and second phase differing modulating voltages having the same frequency across said first and second electro-optic units respectively, the phase difference between said first and second voltages being 90 degrees, the light emerging from said second unit being elliptically polarized with its major axis of polarization rotating at one-half the frequency of said first and second modulating voltages and consisting of a first circularly polarized component rotating in a first direction at the frequency of said incident light beam and a second circularly polarized component rotating in the opposite direction at a frequency differing from the frequency of said incident light beam by the frequency of said modulating voltages.

7. Apparatus for producing single-sideband suppressed-carrier modulation of an incident circularly polarized light beam having a first direction of rotation comprising (a) first and second axially spaced electro-optic units, said units being oriented with respect to said light beam so that, in the absence of an electric field, the velocity of light therein is independent of the polarization direction and, in the presence of an electric field, the fast polarization directions of said first and second electro-optic units are displaced about the beam axis with respect to each other by 45 degrees, (b) means for applying first and second modulating voltages having the same frequency across said first and second phase differing electro-optic units respectively, the phase difference between said first and second voltages being 90 degrees, the light emerging from said second unit being elliptically polarized with its major axis of polarization rotating at one-half the frequency of said first and second modulating voltages and consisting of a first circularly polarized component rotating in a first direction at the frequency of said incident light beam and a second circularly polarized component rotating in the opposite direction at a frequency differing from the frequency of said incident light beam by the frequency of said modulating voltages, and (c) a circular polarization analyzer axially spaced from said second electro-optic unit, said circular polarization analyzer suppressing said first circularly polarized component and transmitting said second circularly polarized component.

8. Apparatus for producing single-sideband modulation of an incident plane polarized light beam comprising (a) first and second axially spaced electro-optic units, the fast polarization direction of said first unit being rotated 45 degrees about the beam axis from the direction of polarization of said plane polarized incident beam, said first and second electro-optic units being oriented with respect to said light beam so that, in the absence of an electric field, the velocity of light therein is independent of the polarization direction and, in the presence of an electric field, the fast polarization directions of said first and second electro-optic units are displaced with respect to each other by 45 degrees, and (b) means for applying first and second voltages across said first and second electro-optic units, said first and second voltages each having first and second alternating components displaced in phase with respect to each other by 90 degrees, said first voltage further having a direct component for retarding said incident light beam one-quarter wavelength, the light emerging from said second unit being elliptically polarized with its major axis of polarization rotating at one-half the frequency of the alternating components of said first and second voltages and consisting of a first circularly polarized component rotating in a first direction at the frequency of said incident light beam and a second circularly polarized component rotating at a frequency differing from the frequency of said incident light by the frequency of said alternating voltages.

9. Apparatus for producing single-sideband suppressed-carrier modulation of an incident plane polarized light beam comprising (a) first and second axially spaced electro-optic units, the fast polarization direction of said first unit being rotated 45 degrees about the beam axis from the direction of polarization of said plane polarized incident beam, said first and second electro-optic units being oriented with respect to said light beam so that, in the absence of an electric field, the velocity of light therein is independent of the polarization direction and, in the presence of an electric field, the fast polarization directions of said first and second electro-optic units are displaced with respect to each other by 45 degrees, (b) means for applying first and second voltages across said first and second electro-optic units, said first and second voltages each having first and second alternating components displaced in phase with respect to each other by 90 degrees, said first voltage further having a direct component for retarding said incident light beam one-quarter wavelength, the light emerging from said second unit being elliptically polarized with its major axis of polarization rotating at one-half the frequency of the alternating components of said first and second voltages and consisting of a first circularly polarized component rotating in a first direction at the frequency of said incident light beam and a second circularly polarized component rotating in the opposite direction at a frequency differing from the frequency of said incident light by the frequency of said alternating voltages, and (c) a circular polarization analyzer axially spaced from said second electro-optic unit, said circular polarization analyzer suppressing said first circularly polarized component and transmitting said second circularly polarized component.

10. Apparatus for producing single-sideband suppressed-carrier modulation of an incident plane polarized light beam comprising (a) first and second axially spaced electro-optic units, the fast polarization direction of said first unit being rotated 45 degrees about the beam axis from the direction of polarization of said plane polarized incident beam, said first and second electro-optic units being oriented with respect to said light beam so that, in the absence of an electric field, the velocity of light therein is independent of the polarization direction and, in the presence of an electric field, the fast polarization directions of said first and second electro-optic units are displaced with respect to each other by 45 degrees, (b) means for applying first and second voltages across said first and second electro-optic units, said first and second voltages each having first and second alternating components displaced in phase with respect to each other by 90 degrees, said first and second voltages further having first and second direct components respectively for retarding the light in said first and second crystals respectively by one-quarter wavelength of said incident light, and (c) a plane polarization analyzer axially spaced from said second electro-optic unit, said analyzer polarizing light in a plane rotated 45 degrees about the beam axis from the direction of fast polarization of said second electro-optic unit, the light emerging from said plane polarization analyzer having a frequency differing from the frequency of said incident light beam by the frequency of the alternating components of said first and second voltages.

11. The method of modulating an incident beam of electromagnetic energy at a frequency $f_m$ comprising the steps of
   (a) elliptically polarizing said incident beam and
   (b) rotating the direction of polarization of said elliptically polarized beam at a frequency equal to one-half $f_m$, said elliptically polarized beam having a circularly polarized component rotating at a frequency differing from the frequency of said incident beam by the frequency $f_m$.

12. The method of modulating an incident beam of electromagnetic energy at a frequency $f_m$ comprising the steps of
   (a) elliptically polarizing said incident beam,
   (b) rotating the direction of polarization of said elliptically polarized beam at a frequency equal to one-half $f_m$, said elliptically polarized beam having a first circularly polarized component rotating at the frequency of said incident beam and a second circularly polarized component rotating at a frequency differing from the frequency of said incident beam by the frequency $f_m$, and
   (c) suppressing said first circularly polarized component and transmitting said second circularly polarized component.

13. Apparatus for producing single-sideband modulation of an incident circularly polarized light beam having a first direction of rotation comprising
   (a) first and second axially spaced electro-optic crystals having their optic axes parallel to the direction of said light beam and their fast polarization directions displaced about the beam axis with respect to each other by 45 degrees,
   (b) first and second electrodes secured to opposite faces of said first electro-optic crystal and third and fourth electrodes secured to opposite faces of said second electro-optic crystal, said first, second, third and fourth electrodes being perpendicular to the optic axes of said first and second crystals,
   (c) means for coupling a first modulation voltage across said first and second electrodes; and
   (d) means for shifting the phase of said modulation voltage 90 degrees and coupling the phase shifted voltage across said third and fourth electrodes, the light emerging from said second electro-optic crystal being elliptically polarized with its major axis of polarization rotating at one half the frequency of said modulation voltage and consisting of a first circularly polarized component rotating in a first direction at the frequency of said incident light beam and a second circularly polarized component rotating in the opposite direction at a frequency differing from the frequency of said incident light beam by the frequency of said modulation voltage.

14. Apparatus for producing single-sideband modulation of an incident circularly polarized light beam as defined by claim 13 wherein said first and second electro-optic crystals consist of potassium dihydrogen phosphate, the fast polarization direction of said crystals lying along their 110 axes.

15. Apparatus for producing single-sideband modulation of an incident polarized light beam comprising
   (a) first and second axially spaced electro-optic crystals having their optic axes parallel to the direction of said light beam and their fast polarization directions parallel to each other;
   (b) first and second electrodes secured to opposite faces of said first electro-optic crystal and third and fourth electrodes secured to opposite faces of said second electro-optic crystal, said first, second, third and fourth electrodes being perpendicular to the optic axes of said first and second crystals;
   (c) means for coupling a first modulation voltage across said first and second electrodes;
   (d) phase shifting means for shifting the phase of said modulation voltage 90 degrees, the output of said phase shifting means being coupled across said third and fourth electrodes, and
   (e) optically active means interposed between said first and second electro-optic crystals, said optically active means rotating the light emerging from said first electro-optic crystal through an angle of 45 degrees about said light beam axis, the light emerging from said second electro-optic crystal being elliptically polarized with its major axis of polarization rotating at one half the frequency of said modulation voltage and consisting of a first circularly polarized component rotating in a first direction at the frequency of said incident light beam and a second circularly polarized component rotating in the opposite direction at a frequency differing from the frequency of said incident light beam by the frequency of said modulation voltage.

16. Apparatus for producing single-sideband modulation of an incident polarized light beam comprising
   (a) a microwave cavity having oppositely located coaxial apertures at each end,
   (b) first and second axially spaced electro-optic crystals located between said apertures, said first and second crystals being oriented with respect to said light beam so that, in the absence of an electric field, the velocity of light therein is independent of the polarization direction and, in the presence of an electric field, the fast polarization directions of said first and second electro-optic crystals are displaced about the beam axes with respect to each other by 45 degrees, and
   (c) means for exciting an electric field in said cavity, said electric field being parallel to the axis of said light beam.

17. Apparatus for modulating an incident polarized light beam at a frequency $f_m$ comprising
   (a) a microwave cavity having oppositely located coaxial apertures at each end,
   (b) first and second axially spaced electro-optic crystals located between said apertures, the spacing between said first and second crystals being such that the light requires an odd multiple of quarter periods of the modulation frequency $f_m$ to travel between said crystals, said first and second crystals being oriented with respect to said light beam so that, in the absence of an electric field, the velocity of light therein is independent of the polarization direction and, in the presence of an electric field, the fast polarization directions of said first and second electro-optic crystals are displaced about the beam axis with respect to each other by 45 degrees, and
   (c) means for exciting an electric field in said cavity, said electric field being parallel to the axes of said light beam and in phase at said first and second crystals.

18. A light modulator comprising
   (a) a light source, said source directing a beam of monochromatic light along a beam axis;
   (b) a light polarizer located adjacent to said source along said beam axis;
   (c) first and second axially spaced electro-optic crystals having their optic axes parallel to the direction of said light beam and their fast polarization directions displaced about the beam axis with respect to each other by 45 degrees;
   (d) first and second electrodes secured to opposite faces of said first electro-optic crystal and third and fourth electrodes secured to opposite faces of said second electro-optic crystal, said first, second, third and fourth electrodes being perpendicular to the optic axes of said first and second crystals;

(e) means for coupling a first modulating voltage across said first and second electrodes;

(f) means for shifting the phase of said modulation voltage 90 degrees and coupling the phase shifted voltage across said third and fourth electrodes, the light emerging from said second electro-optic crystal being elliptically polarized with its major axis of polarization rotating at one half the frequency of said modulation voltage, said elliptically polarized light consisting of a first circularly polarized component rotating in a first direction at the frequency of said incident light beam and a second circularly polarized component rotating in the opposite direction at a frequency differing from the frequency of said incident light beam by the frequency of said modulation voltage; and (g) a circular polarization analyzer axially spaced from said second electro-optic crystal, said circular poalrization analyzer suppressing said first circularly polarized component and transmitting said second circularly polarized component.

19. A light modulator as defined by claim 18 wherein said light polarizer circularly polarizes the light emitted by said light source.

References Cited by the Examiner

UNITED STATES PATENTS

| | | | |
|---|---|---|---|
| 1,792,752 | 2/1931 | Michelssen | 88—61 |
| 2,780,958 | 2/1957 | Wiley | 88—61 |
| 2,788,710 | 4/1957 | West | 88—65 |
| 2,829,555 | 4/1958 | Keston | 88—65 |

FOREIGN PATENTS 132,858   9/1919   Great Britain.

OTHER REFERENCES

Cacheris: "Microwave Single-Sideband Modulator Using Ferrites," Proc. I.R.E., vol. 42, No. 8, August 1954, pp. 1242–1247.

Hogan: Tele-Tech & Electronic Industries, November 1954, pp. 64–66 and 37–140.

Holshouser et al.: Jour. Opt. Soc. America, vol. 51, No. 12, December 1961, pp. 1360–1365.

Blumenthal: Proc. I.R.E., vol. 50, No. 4, April 1962, pp. 452–456.

DAVID G. REDINBAUGH, *Primary Examiner.*